(12) United States Patent
Raveendran

(10) Patent No.: US 11,724,707 B2
(45) Date of Patent: Aug. 15, 2023

(54) VEHICULAR CONTROL SYSTEM WITH AUTOMATIC STACK CLEARING OF STACK FRAME

(71) Applicant: Magna Electronics Inc., Auburn Hills, MI (US)

(72) Inventor: Bishnu Raveendran, Troy, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 204 days.

(21) Appl. No.: 17/305,411

(22) Filed: Jul. 7, 2021

(65) Prior Publication Data

US 2022/0009507 A1    Jan. 13, 2022

Related U.S. Application Data

(60) Provisional application No. 62/705,625, filed on Jul. 8, 2020.

(51) Int. Cl.
*B60W 50/00* (2006.01)
*B60R 16/023* (2006.01)
*H04N 7/18* (2006.01)

(52) U.S. Cl.
CPC ..... *B60W 50/0098* (2013.01); *B60R 16/0231* (2013.01); *B60W 2420/42* (2013.01); *H04N 7/18* (2013.01)

(58) Field of Classification Search
CPC .......... B60W 50/0098; B60W 2420/42; B60R 16/0231; H04N 7/18; G06F 9/461; G06F 8/41; G06F 21/52; G06F 12/0223
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,760,962 A | 6/1998 | Schofield et al. |
| 5,796,094 A | 8/1998 | Schofield et al. |
| 5,877,897 A | 3/1999 | Schofield et al. |
| 5,949,331 A | 9/1999 | Schofield et al. |
| 6,097,023 A | 8/2000 | Schofield et al. |
| 6,201,642 B1 | 3/2001 | Bos |
| 6,222,447 B1 | 4/2001 | Schofield et al. |
| 6,302,545 B1 | 10/2001 | Schofield et al. |

(Continued)

*Primary Examiner* — Behrang Badii
(74) *Attorney, Agent, or Firm* — Honigman LLP

(57) ABSTRACT

A vehicular control system includes an electronic control unit (ECU) that includes (i) a next stack activation size hardware register and (ii) a hardware memory initializer configured to initialize memory. The ECU determines a maximum stack size of a vehicle control function called by a root function. The vehicle control function controls a system of the equipped vehicle. The next stack activation size hardware register stores a value equivalent to the determined maximum stack size of the first function. The ECU, prior to executing the vehicle function and while executing the root function, triggers execution of the hardware memory initializer. The hardware memory initializer initializes memory in parallel with execution of the root function based on the next stack activation size hardware register. The ECU executes the vehicle control function responsive to receiving an indication of completion from the hardware memory initializer indicating the memory initialization is complete.

20 Claims, 5 Drawing Sheets

(56) References Cited

U.S. PATENT DOCUMENTS

| | | |
|---|---|---|
| 6,313,454 B1 | 11/2001 | Bos et al. |
| 6,320,176 B1 | 11/2001 | Schofield et al. |
| 6,353,392 B1 | 3/2002 | Schofield et al. |
| 6,396,397 B1 | 5/2002 | Bos et al. |
| 6,498,620 B2 | 12/2002 | Schofield et al. |
| 6,523,964 B2 | 2/2003 | Schofield et al. |
| 6,559,435 B2 | 5/2003 | Schofield et al. |
| 6,611,202 B2 | 8/2003 | Schofield et al. |
| 6,690,268 B2 | 2/2004 | Schofield et al. |
| 6,717,610 B1 | 4/2004 | Bos et al. |
| 6,757,109 B2 | 6/2004 | Bos |
| 6,802,617 B2 | 10/2004 | Schofield et al. |
| 6,806,452 B2 | 10/2004 | Bos et al. |
| 6,822,563 B2 | 11/2004 | Bos et al. |
| 6,831,261 B2 | 12/2004 | Schofield et al. |
| 6,891,563 B2 | 5/2005 | Schofield et al. |
| 6,946,978 B2 | 9/2005 | Schofield |
| 7,004,606 B2 | 2/2006 | Schofield |
| 7,038,577 B2 | 5/2006 | Pawlicki et al. |
| 7,339,149 B1 | 3/2008 | Schofield et al. |
| 7,480,149 B2 | 1/2009 | DeWard et al. |
| 7,526,103 B2 | 4/2009 | Schofield et al. |
| 7,720,580 B2 | 5/2010 | Higgins-Luthman |
| 7,855,755 B2 | 12/2010 | Weller et al. |
| 7,859,565 B2 | 12/2010 | Schofield et al. |
| 9,203,100 B2 * | 12/2015 | Kells ................. H01M 8/04395 |
| 11,610,129 B2 * | 3/2023 | Bai ....................... G06T 3/4007 |
| 2010/0261079 A1 * | 10/2010 | Kells .................. H01M 8/0491 |
| | | 429/432 |
| 2021/0326663 A1 * | 10/2021 | Winston ............... G06V 10/764 |
| 2021/0383234 A1 * | 12/2021 | Bai ....................... G06T 3/4069 |

* cited by examiner

VEHICULAR CONTROL SYSTEM WITH AUTOMATIC STACK CLEARING OF STACK FRAME

CROSS REFERENCE TO RELATED APPLICATION

The present application claims the filing benefits of U.S. provisional application Ser. No. 62/705,625, filed Jul. 8, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A software system for a vehicle includes an electronic control unit (ECU) disposed at a vehicle equipped with the vehicular control system that includes electronic circuitry and associated software. The ECU also includes (i) a next stack activation size hardware register configured to store a stack size value and (ii) a hardware memory initializer configured to initialize memory. The ECU determines a maximum stack size of a vehicle control function called by a root function of software associated with the electronic circuitry of the ECU. The vehicle control function controls a system of the equipped vehicle. The next stack activation size hardware register stores a value equivalent to the determined maximum stack size of the vehicle control function and the ECU, prior to executing the vehicle control function, and while executing the root function, triggers execution of the hardware memory initializer. The hardware memory initializer, responsive to being triggered by the ECU, initializes memory based on the next stack activation size hardware register and in parallel with execution of the root function. The ECU executes the vehicle control function responsive to receiving an indication of completion from the hardware memory initializer indicating the memory initialization is complete.

These and other objects, advantages, purposes and features of the present invention will become apparent upon review of the following specification in conjunction with the drawings.

DESCRIPTION OF THE PREFERRED EMBODIMENTS

Figure 1:
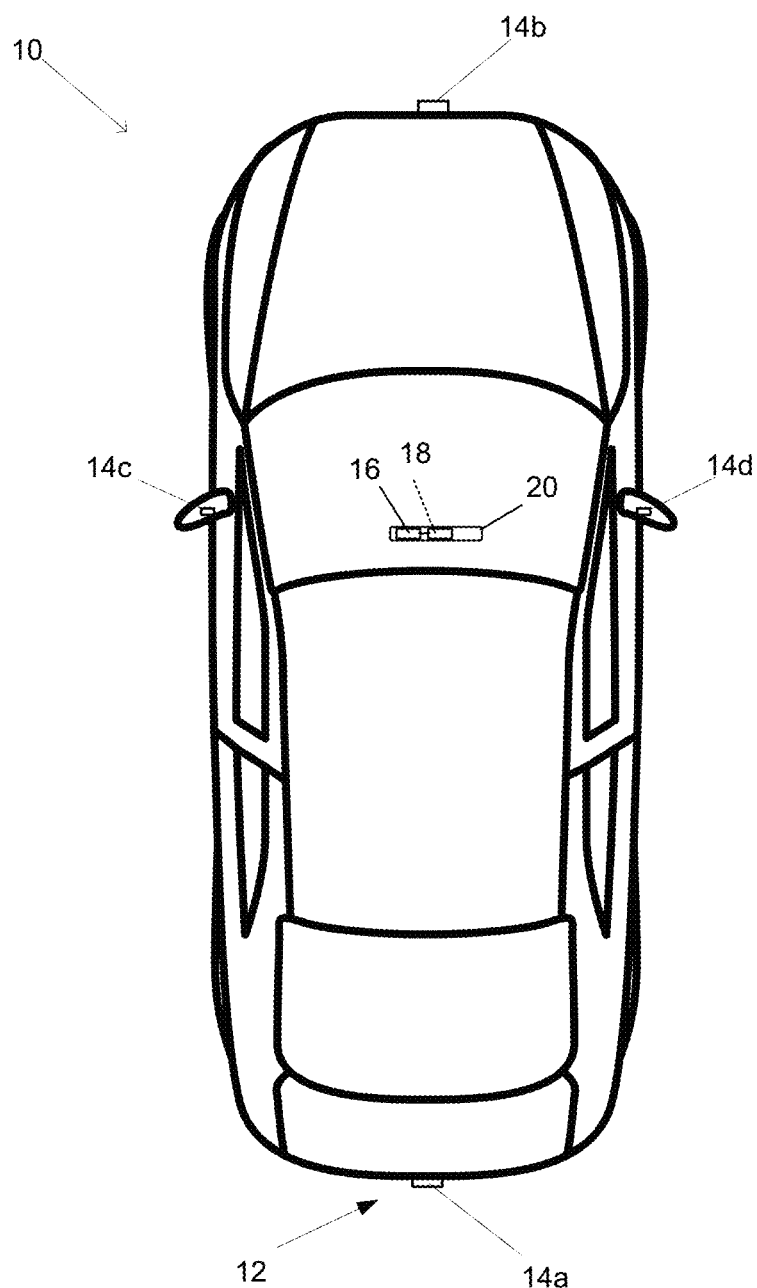
FIG. 1 is a plan view of a vehicle with a vision system that incorporates cameras.

Modern vehicle system (such as a vision system and/or driver or driving assist system and/or object detection system and/or alert system) operate based on software executing on processing hardware. For example, as shown in FIG. 1, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 (i.e., processing hardware) having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

When coding and/or programming applications for safety related systems such as vehicular vision systems and driving assist systems and the like, deterministic behavior is generally an absolute requirement. This often drives a requirement of initialization of stack variables from static code analysis perspective. However, these initialized stack variables often cause the processor to execute additional instructions to initialize memory to a known (e.g., "zero out" the memory).

Implementations of the system involve defaulting or initializing the memory of the next stack frame to a fixed value. Thus, the stack activation frame (also known as a call stack or an execution stack or a control stack) at every run will execute deterministically with a fixed value and between runs, execution is not affected by stale values. Furthermore, stack overflows may be detected prior to calling the actual function. An automatic stack clearing system includes an additional hardware register definition (e.g., Reg_NextStackActivationSize) that maintains the value of a max stack activation frame size for a function that is callable from the current function. The system also includes dedicated memory clearing hardware (e.g., HW_MemClear) that is capable of clearing memory in parallel with the processor. The HW_MemClear accepts Reg_NextStackActivationSize and a stack pointer. The system also includes two additional instructions that allow functions to manipulate HW_MemClear and provides a status of HW_MemClear.

Figure 2:
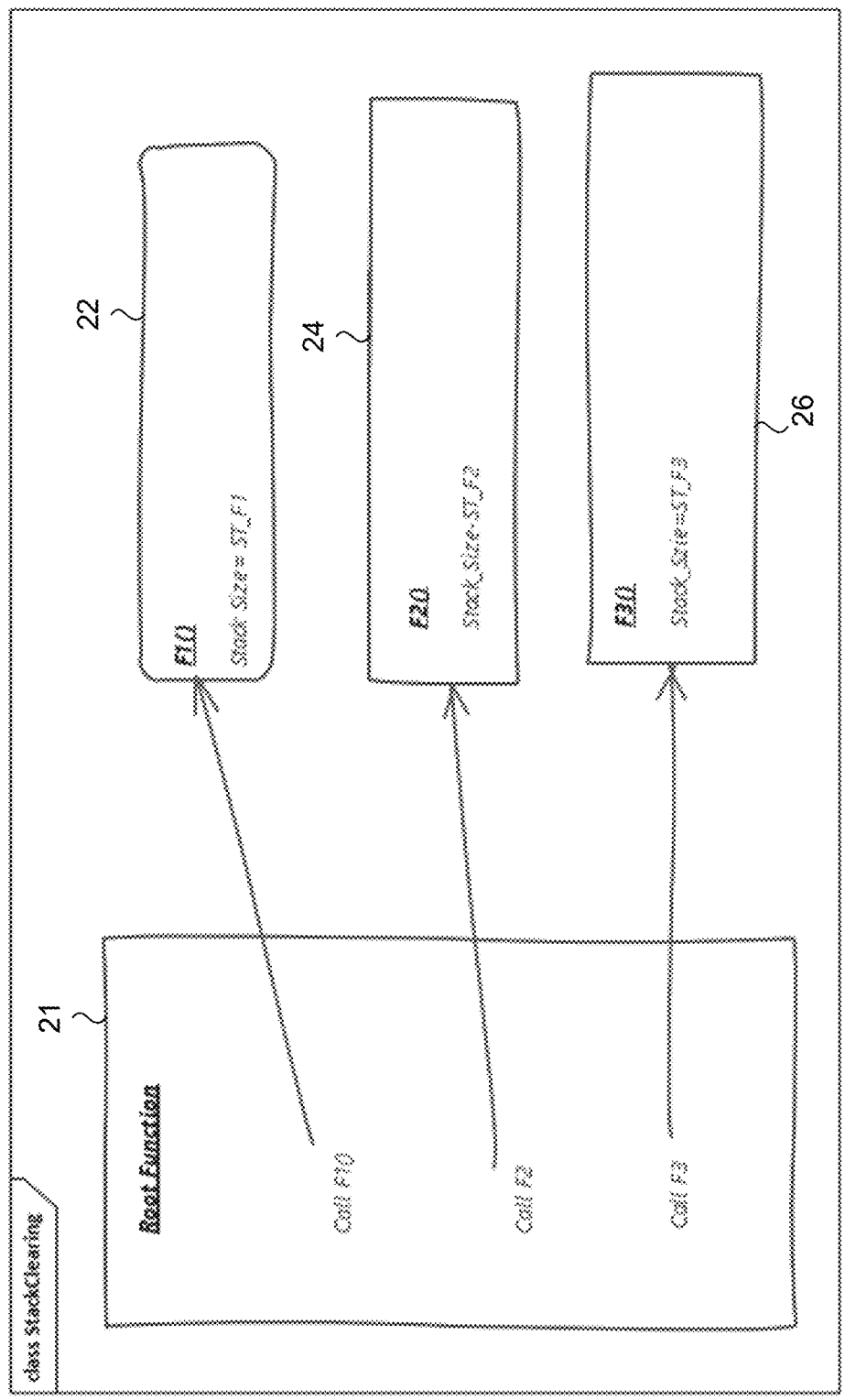
FIG. 2 is a schematic view of a root function that calls a plurality of functions.

Referring now to FIG. 2, the automatic stack clearing system includes a compiler that, during compile time of applications (such as vehicular vision system applications or driver assistance applications configured to execute on an electronic control unit (ECU) of a vehicle), determines a maximum stack frame size of an immediate function that is callable from the current function. For example, FIG. 2 illustrates a root function 21 that includes three function calls to three separate functions 22, 24, 26. The first function F1 has a stack size of ST_F1, the second function F2 has a stack size of ST_F2, and the third function F3 has a stack size of ST_F3. The system determines that the next stack activation size is a max of the combination of the stack sizes of ST_F1, ST_F2, and ST_F3 (e.g., the size of the stack of the three functions F1, F2, and F3 added together).

Figure 3:
FIG. 3 is a schematic view of instructions of the root function.
Figure 4:
FIG. 4 is a schematic view of instructions for the plurality of functions.

Referring now to FIG. 3, the root function sets the Reg_NextStackActivationSize register to equal the next stack activation size previously determined (i.e., the maximum possible stack size). The root function also instructs HW_MemClear to begin initializing memory (e.g., to predetermined fixed values such as all zeros or all ones). FIG. 4 illustrates that each function F1, F2, and F3 includes an instruction to wait for the completion of HW_MemClear before continuing execution. For example, the HW_Memclear may provide a control or processor executing the functions with an indication that the memory has been initialized. Alternatively, the control may periodically poll or query the HW_Memclear to determine whether the memory initialization is complete. Thus, the functions (e.g., F1, F2, and F3), which may control an aspect of the vehicle (such as a vehicular vision system or a vehicular driver assist system or the like), will not begin to execute until after the memory has been initialized by the HW_MemClear.

Figure 5:
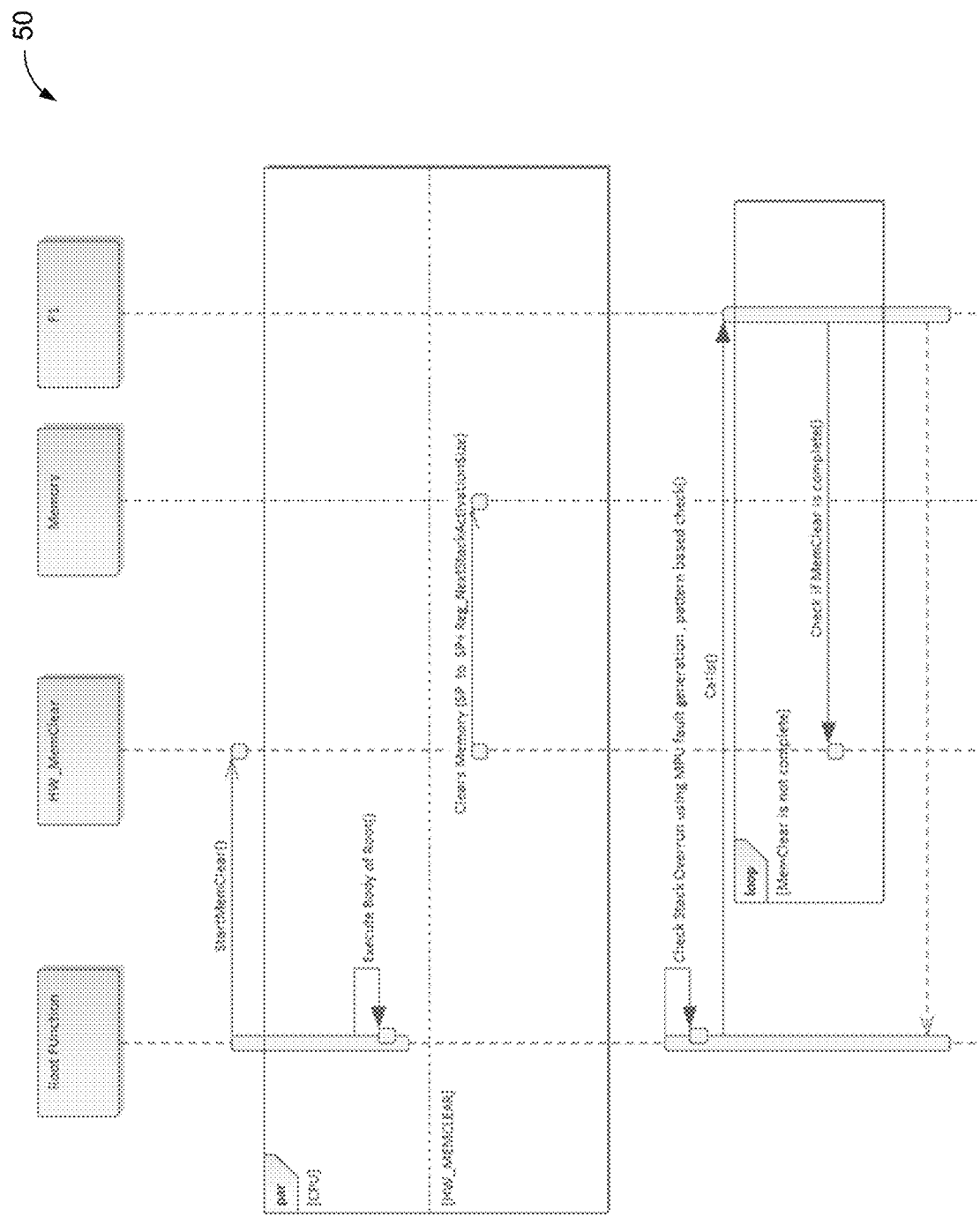
FIG. 5 is a sequence diagram of the root function and memory clearing hardware.

Referring now to FIG. 5, a sequence diagram 50 diagrams an exemplary sequence for the automatic stack clearing system. In this example, the root function upon beginning execution immediately loads the register Reg_NextStackActivationSize and requests HW_MemClear to begin clearing memory. The HW_MemClear unit uses the stack pointer and the Reg_NextStackActivationSize and, in parallel with the CPU (that is, HW_MemClear is independent and does not require CPU assistance) clears the memory while the root function (via the CPU) continues with execution of the body of the function.

Just prior to the root function calling function F1, the root function executes a stack overflow check. Thus, the system always clears the required memory deterministically. Often in software code, not all variables in stack are written. When stack corruption occurs, this results in non-deterministic stack corruption which is often extremely difficult to debug or analyze. In contrast, the automatic stack clearing system described herein deterministically clears the stack to always guarantee that a stack overflow does not occur and improve performance and debugging capabilities.

Thus, the automatic stack clearing system provides a deterministic and reliable means of implementing the stack function in vehicular safety systems. For example, a vehicular vision system, such as a vision-based vehicular objection detection system implements software that executes on electronic circuitry of a control. The electronic circuitry includes a processor and memory. A root function of the object detection system software may, prior to calling functions related to the object detection system (e.g., a function that retrieves image data captured by a camera), establish a program stack as described herein for the called function to avoid stack overflow.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, the vehicular control system comprising:
   an electronic control unit (ECU) disposed at a vehicle equipped with the vehicular control system, the ECU comprising electronic circuitry and associated software;
   wherein the ECU comprises (i) a next stack activation size hardware register configured to store a stack size value and (ii) a hardware memory initializer configured to initialize memory;
   wherein the ECU determines a maximum stack size of a vehicle control function called by a root function of software associated with the electronic circuitry of the ECU, and wherein the vehicle control function controls a system of the equipped vehicle;
   wherein the next stack activation size hardware register stores a value equivalent to the determined maximum stack size of the vehicle control function;
   wherein the ECU, prior to executing the vehicle control function, and while executing the root function, triggers execution of the hardware memory initializer;
   wherein the hardware memory initializer, responsive to being triggered by the ECU, initializes memory based on the next stack activation size hardware register in parallel with execution of the root function; and
   wherein the ECU executes the vehicle control function responsive to receiving an indication of completion from the hardware memory initializer indicating the memory initialization is complete.

2. The vehicular control system of claim 1, wherein the hardware memory initializer initializes an amount of memory equivalent to the value stored in the stack activation size hardware register.

3. The vehicular control system of claim 1, wherein the ECU, while executing the root function and when triggering the hardware memory initializer, passes a stack pointer representative of a first memory location to initialize to the hardware memory initializer.

4. The vehicular control system of claim 1, wherein the root function is an operating system.

5. The vehicular control system of claim 1, wherein the ECU, during compilation of the software, determines a maximum size of a stack size of a plurality of functions.

6. The vehicular control system of claim 1, wherein the hardware memory initializer initializes each location in memory to the same value.

7. The vehicular control system of claim 1, wherein the ECU, while executing the root function and prior to executing the vehicle control function, executes a stack overflow check.

8. The vehicular control system of claim 1, wherein the controlled system of the equipped vehicle comprises a vehicular vision system.

9. The vehicular control system of claim 1, wherein the controlled system of the equipped vehicle comprises a driving assist system.

10. A vehicular control system, the vehicular control system comprising:
  an electronic control unit (ECU) disposed at a vehicle equipped with the vehicular control system, the ECU comprising electronic circuitry and associated software;
  wherein the ECU comprises (i) a next stack activation size hardware register configured to store a stack size value and (ii) a hardware memory initializer configured to initialize memory;
  wherein the ECU determines a maximum stack size of a vehicle control function called by a root function of software associated with the electronic circuitry of the ECU based on compilation of the vehicle control function, and wherein the vehicle control function controls a system of the equipped vehicle;
  wherein the next stack activation size hardware register stores a value equivalent to the determined maximum stack size of the vehicle control function;
  wherein the ECU, prior to executing the vehicle control function, and while executing the root function, triggers execution of the hardware memory initializer;
  wherein the hardware memory initializer, responsive to being triggered by the ECU, initializes an amount of memory equivalent to the value stored in the stack activation size hardware register in parallel with execution of the root function; and
  wherein the ECU executes the vehicle control function responsive to receiving an indication of completion from the hardware memory initializer indicating the memory initialization is complete.

11. The vehicular control system of claim 10, wherein the root function is an operating system.

12. The vehicular control system of claim 10, wherein the hardware memory initializer initializes each location in memory to the same value.

13. The vehicular control system of claim 10, wherein the ECU, while executing the root function and prior to executing the vehicle control function, executes a stack overflow check.

14. The vehicular control system of claim 10, wherein the controlled system of the equipped vehicle comprises a vehicular vision system.

15. The vehicular control system of claim 10, wherein the controlled system of the equipped vehicle comprises a driving assist system.

16. A vehicular control system, the vehicular control system comprising:
  an electronic control unit (ECU) disposed at a vehicle equipped with the vehicular control system, the ECU comprising electronic circuitry and associated software;
  wherein the ECU comprises (i) a next stack activation size hardware register configured to store a stack size value and (ii) a hardware memory initializer configured to initialize memory;
  wherein the ECU determines a maximum stack size of a vehicle control function called by a root function of software associated with the electronic circuitry of the ECU, and wherein the vehicle control function controls a system of the equipped vehicle;
  wherein the next stack activation size hardware register stores a value equivalent to the determined maximum stack size of the vehicle control function;
  wherein the ECU, prior to executing the vehicle control function, and while executing the root function, triggers execution of the hardware memory initializer;
  wherein the hardware memory initializer, responsive to being triggered by the ECU, initializes each memory location in a range of memory location to the same value in parallel with execution of the root function, and wherein the range of memory locations is based on the next stack activation size hardware register; and
  wherein the ECU executes the vehicle control function responsive to receiving an indication of completion from the hardware memory initializer indicating the memory initialization is complete.

17. The vehicular control system of claim 16, wherein the ECU, while executing the root function and when triggering the hardware memory initializer, passes a stack pointer representative of a first memory location to initialize to the hardware memory initializer.

18. The vehicular control system of claim 16, wherein the root function is an operating system.

19. The vehicular control system of claim 16, wherein the controlled system of the equipped vehicle comprises a vehicular vision system.

20. The vehicular control system of claim 16, wherein the controlled system of the equipped vehicle comprises a driving assist system.

* * * * *